United States Patent [19]
Denz et al.

[11] Patent Number: 5,452,698
[45] Date of Patent: Sep. 26, 1995

[54] DEVICE FOR SUPPRESSING DISCONTINUOUS MOTION OF A MOVING MOTOR VEHICLE

[75] Inventors: Helmut Denz, Stuttgart; Ernst Wild, Oberriexington, both of Germany

[73] Assignee: Robert Bosch GmbH, Stuttgart, Germany

[21] Appl. No.: 331,363

[22] Filed: Oct. 27, 1994

Related U.S. Application Data

[63] Continuation-in-part of Ser. No. 965,263, filed as PCT/DE91/00541, Jun. 29, 1991, abandoned.

[30] Foreign Application Priority Data

May 7, 1990 [DE] Germany .................. 40 21 440.0

[51] Int. Cl.[6] ........................................ F02P 5/06
[52] U.S. Cl. ............................................... 123/419
[58] Field of Search ................................ 123/419, 418, 123/422, 425; 364/431.08; 73/117.3

[56] References Cited

U.S. PATENT DOCUMENTS

| | | | |
|---|---|---|---|
| 4,596,217 | 6/1986 | Bonitz et al. | 123/425 |
| 4,799,469 | 1/1989 | Nagano et al. | 123/418 |
| 4,919,098 | 4/1990 | Shimada et al. | 123/422 |
| 4,984,988 | 1/1991 | Mizushina et al. | 123/419 |
| 4,993,389 | 2/1991 | Ahlborn et al. | 123/419 |
| 5,200,899 | 4/1993 | Ribbens et al. | 364/431.08 |
| 5,233,961 | 8/1993 | Fukui et al. | 123/419 |
| 5,237,504 | 8/1993 | Holmes et al. | 364/431.08 |
| 5,239,963 | 8/1993 | Ikebe et al. | 123/419 |
| 5,263,365 | 11/1993 | Muller et al. | 73/117.3 |

*Primary Examiner*—Raymond A. Nelli
*Attorney, Agent, or Firm*—Michael J. Striker

[57] ABSTRACT

A device for suppressing a discontinuous motion of a motor vehicle driven by an internal combustion engine.

14 Claims, 6 Drawing Sheets

DEVICE FOR SUPPRESSING DISCONTINUOUS MOTION OF A MOVING MOTOR VEHICLE

BACKGROUND OF THE INVENTION

This is a continuation-in-part of U.S. patent application, Ser. No. 07/965,263, as PCT/DE91/00541, Jun. 29, 1991, and now abandoned.

The present invention relates to a device for suppression of discontinuous motion, e.g. preventing bucking, in a moving motor vehicle and, more particularly, for suppressing discontinuous notion with a torque correction via control of ignition angle.

Discontinuous movements of the vehicle, in particular longitudinal vibrations in the direction of travel of the vehicle, can occur both in steady-state operation, that is at a constant Speed, and especially during acceleration and braking operation, that is in the case of changes in speed. In a known device (German Published Patent Application 3,837,876), an ignition-instant adjusting device for internal-combustion engines is disclosed which suppresses such vibration of the vehicle during accelerations. This is achieved by the formation of a first ignition-instant correction variable, which is determined by the change in the speed change of the engine, and of a second ignition-instant correction variable, which is determined by the engine load state, and correction of a basic ignition instant in accordance with the first and the second ignition-instant correction variables when the vehicle is accelerated. This known device is designed to suppress vibrations of the vehicle body during accelerations. However, bucking movements can also occur during steady-state operation, for example when the engine is cold. This device is furthermore of relatively complex design.

Another known device for suppressing longitudinal vibrations of a vehicle (EP 0 315 172 A2) contains a mechanical acceleration sensor which responds directly to vehicle longitudinal vibrations and produces an output signal which is fed to a torque control device which effects a change in the ignition angle. Mechanical measurement of the vehicle vibrations by an acceleration sensor is complex, expensive and relatively fault-prone.

SUMMARY OF THE INVENTION

It is an object of the present invention to provide a device for suppressing discontinuous motion, particularly longitudinal vibrations in the direction of travel, of a moving motor vehicle, which does not have the above-mentioned disadvantages.

According to the invention, differential rotational velocity values for successive time intervals or values of the time derivative of the rotational velocity are formed. The differential rotational velocity values address a characteristic curve, by which values for ignition angle corrections are formed, i.e. an ignition angle correction is determined from a known characteristic functional relationship between ignition angle correction values and differential rotational velocity values. This ignition angle correction is added to the ignition-angle precontrol value or the setpoint ignition angle. The corrective ignition angle is formed as a function of the size and the sign of the differential rotational velocity values such that a torque Correction in opposition to the longitudinal vibration occurs. The action of such a device corresponds to the action Of a D component in a control circuit for the prevention of discontinuous motion.

This ignition-angle negative feedback always occurs in the correct phase position, i.e. in phase opposition, since the torque is controlled without a delay by the ignition angle. A precondition for this is the ignition-synchronous calculation and output of the respective ignition angle correction.

Since sensors for determining the rotational velocity and devices for changing the ignition angle are present in any case in customary engine control devices, the device according to the invention for preventing bucking can be installed in the form of circuitry in the electronic circuit portion of the ignition system with comparative small additional expense.

The device for suppressing a discontinuous motion of a moving motor vehicle powered by an internal combustion engine comprises:

means for measuring engine rotational velocity to obtain an electronic signal characteristic of a plurality of successively measured engine rotational velocities in successive time intervals;

means for producing a differential rotational velocity signal from the electronic signal of the means for measuring engine rotational velocity, the differential rotational velocity signal being characteristic of differential rotational velocities formed from the successively measured engine rotational velocities;

means for obtaining a dynamically corrected differential rotational velocity signal from the differential rotational velocity signal, the dynamically corrected differential rotational velocity signal being characteristic of a plurality of dynamically corrected differential rotational velocities derived from the differential rotational velocities and characteristic only of the discontinuous motion of the motor vehicle;

means for addressing a characteristic function definitive of a relationship between a set of ignition angle correction values and the dynamically corrected differential rotational velocities with the dynamically corrected differential rotational velocity signal to obtain at least one of the ignition angle correction values for suppression of the discontinuous motion; and means for adding the at least one ignition angle correction value obtained from the means for addressing to at least once corresponding setpoint ignition angle value to provide at least one corrected ignition angle value for operation of the internal combustion engine in a manner suppressive of the discontinuous motion.

In a preferred embodiment of the invention the means for obtaining the dynamically corrected differential rotational velocity signal includes a high pass filter for substantially passing only high frequency oscillating differential rotational velocity components characteristic of the discontinuous motion. This high pass filter can be formed from a low pass filter which produces an averaged differential rotational velocity signal from the differential rotational velocity signal and a simple circuit means for subtracting the averaged differential rotational velocity signal from the differential rotational velocity signal to obtain the dynamically corrected differential rotational velocity signal characteristic only of the discontinuous motion of the motor vehicle.

A microcomputer/controller similar to those currently in use to control ignition and fuel injection is used to stored the characteristic function addressed by the dynamically corrected differential rotational velocity signal to obtain the ignition angle correction values. The microcomputer/controller can also contain a simple stored program for obtaining the corrected ignition angle values from the set point ignition angles by adding the ignition angle correction values. This program can also include features suppressing the ignition angle correction if the engine speed and load are less than predetermined threshold values.

In other preferred embodiments the ignition angle correction can be suppressed if the engine rotational speed and load are less than predetermined threshold values.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
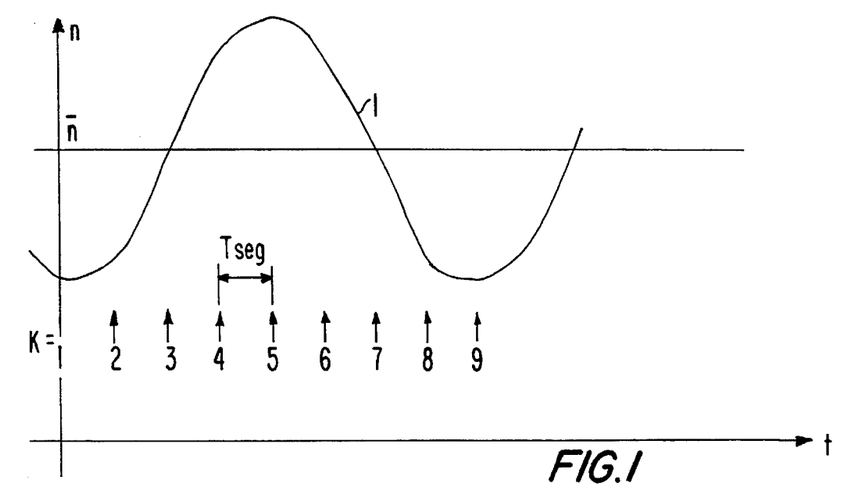
FIG. 1 is a graphically illustration of a sinusoidal vehicle longitudinal vibration during steady-state operation over successive time intervals in which rotational velocity differences (Dn) are formed.

In FIG. 1, the rotational velocity, n, is plotted versus the time t for a bucking vibration 1, in the form of a sinusoidal vibration. The resulting averaged rotational velocity is a horizontal straight line, that is to say a steady-state operating condition without general acceleration is under consideration. The arrows K=1 to 9 represent the beginning and end of time segments, Tseg, the engine rotational velocity being recorded over in each case one time segment period Tseg.

Figure 2:
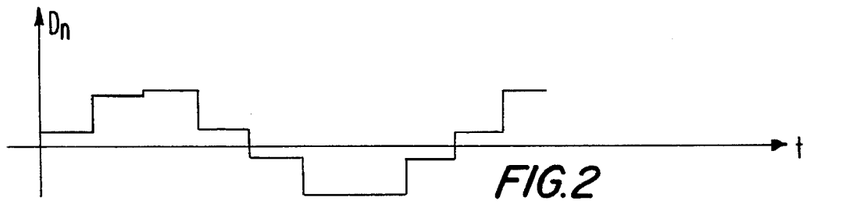
FIG. 2 is a graphical illustration of the time dependence of the differential rotational velocity values (Dn) formed in accordance with FIG. 1.

FIG. 2 shows the time characteristic of the rotational velocity difference Dn as a step function, rising rotational velocity values leading to positive differential rotational velocity values Dn and falling rotational rotational velocities n leading to negative differential rotational velocity values in accordance with the relation $$Dn(k)=n(k)-n(k-1).$$

Figure 3:
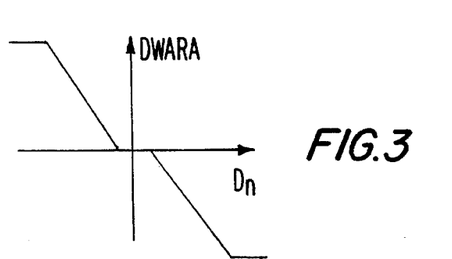
FIG. 3 is a graphical illustration of a characteristic curve (DWARA versus Dn) for determining an ignition angle correction, DWARA.

The differential rotational velocity values Dn address a characteristic curve, DWARA, (Differenz-Winkel-Anti-Ruckelfunktion-Aktiv or, in the English language, differential-angle-antibucking function-active) versus the rotational velocity differences Dn in accordance with FIG. 3.

Figure 4:
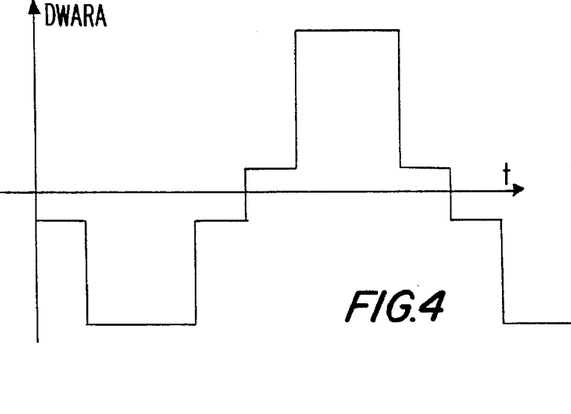
FIG. 4 is a graphical illustration showing the determined ignition angle correction, DWARA.

This results in a reflection and vertical enlargement of the functioin according to FIG. 2 to give the function depicted in FIG. 4, which represents an ignition angle correction values, DWARA, versus time, t.

Figure 5:
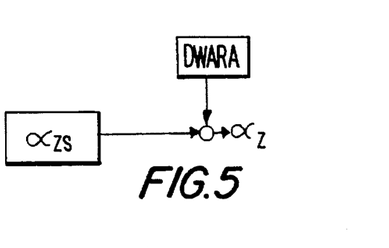
FIG. 5 is a diagrammatic representation of an adder for summing the precontrol ignition-angle value or setpoint ignition angle predetermined by the engine control system with the ignition angle correction, DWARA, to produce a current ignition angle value, $\alpha z$.

In accordance with FIG. 5, this corrective ignition angle correction value, DWARA, is added to a customary precontrol ignition-angle value or setpoint ignition angle, $\alpha zS$, from an ignition angle to give a corrected ignition angle, $\alpha z$.

In the case of steady-state operation (No acceleration) Of the vehicle and the occurrence of bucking vibrations, these are detected via the differential rotational velocity values Dn determined and an ignition angle correction, DWARA, in accordance with FIG. 4, varying in phase opposition, is determined therefrom and summed with the setpoint ignition angle. As is known, an alteration in the ignition angle is also associated with an alteration in the torque output by the internal combustion engine (see, for example, FIG. 14), with the result that a negative feedback in relation to the rotational velocity fluctuations of the longitudinal vehicle vibrations by torque correction in precise phase opposition is effected via an ignition-angle correction and the discontinuous longitudinal vibrations are largely eliminated. The action corresponds to a D component in the control circuit for eliminating longitudinal vibrations. The negative feedback of the ignition angle always occurs in the correct phase position since the control of the torque by the ignition angle is virtually without a delay, it being assumed that the calculation of the ignition-angle correction is effected synchronously with ignition.

In the center, the characteristic function according to FIG. 3 show is an insensitivity zone, with the result that (if required), the D component of the ignition angle correction, DWARA, is here eliminated where rotational velocity fluctuations are small or nonexistent.

Figure 6:
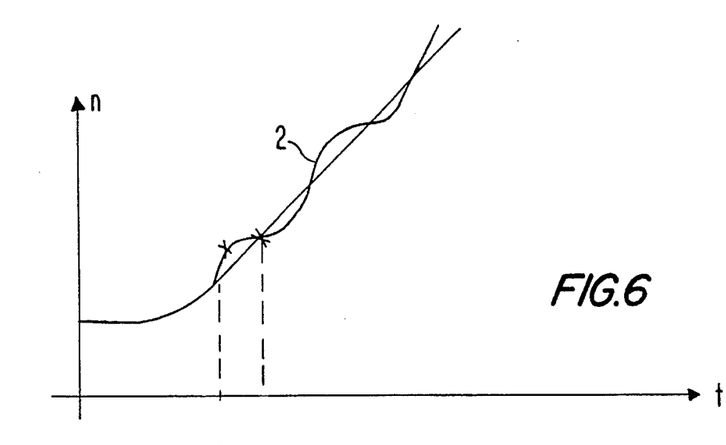
FIG. 6 is a graphical illustration of the relationship between engine rotational velocity and time during an acceleration with a superimposed longitudinal vibration.

FIG. 6 corresponds to FIG. 1, except it no longer shows steady-state operation FIG. 6 depicting instead accelerated operation with a engine rotational velocity increasing, upon which is again superimposed an approximately sinusoidal longitudinal vehicle vibration 2.

Figure 7:
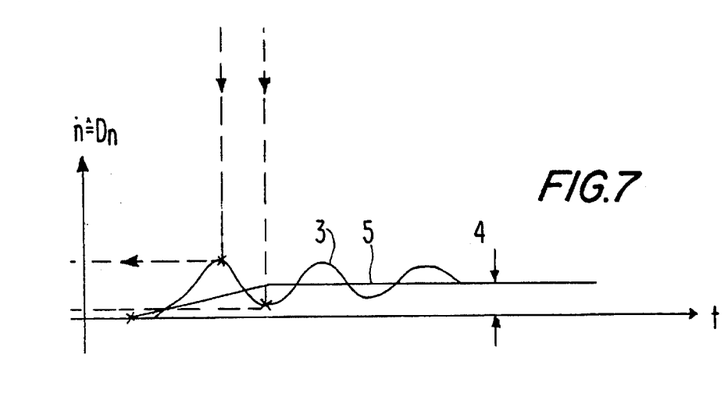
FIGS. 7, 8 and 9 are respective graphical illustrations of differential engine rotational velocity versus time, ignition angle correction values versus differential rotational velocity and ignition angle correction values versus time which together show the steps in determining the time dependence of the ignition angle correction, DWARA, (FIG. 9) without dynamic correction and with a general retardation of the ignition angle after correction.

FIG. 7 shows the time derivative, dn/dt, of the engine rotational velocity, n, this corresponding to the (step-shaped) representation of the differential rotational velocity values Dn.

The constant rotational velocity increase has the result that the curve 3 in accordance with dn/dt which is again approximately sinusoidal, is shifted upwards by a positive amount 4 relative to the zero line and is symmetrical about the horizontal line 5 formed thereby.

Figure 8:
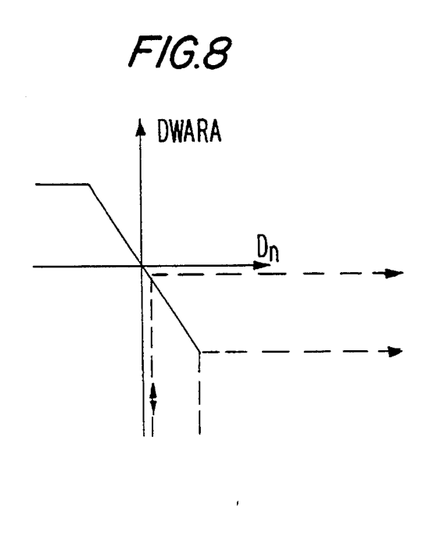
Figure 9:
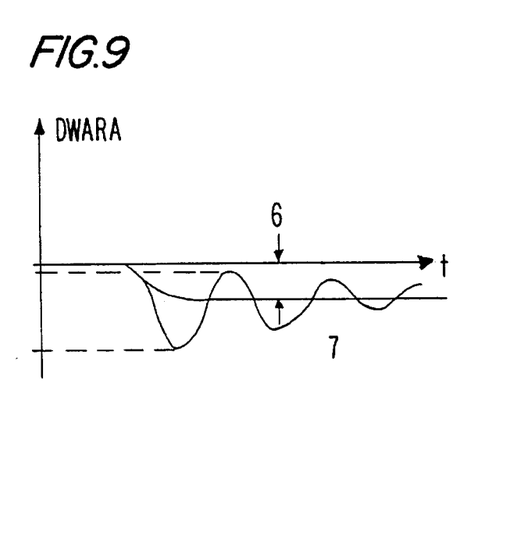

As shown in FIG. 8, only the lower branch of the characteristic curve is addressed due to tile positive shift by the amount 4, with the result that the ignition angle correction values DWARA in accordance with FIG. 9 which are determined contain a general shift 6 towards a retarded ignition angle, about which the curve 7 is symmetrical. This general shift 6 in the ignition angle towards retarded ignition generally leads to a torque reduction, with the result that a generally lower torque is available in this case during the acceleration of the vehicle.

A positive solution to this problem could consist in prohibiting an ignition angle correction via the device according to the invention for preventing bucking if acceleration with engine rotational velocity rising or dropping is desired, with the result that it would not be necessary to accept an excessively retarded ignition angle, but in this case no damping of the longitudinal vibrations would be possible either.

As a better solution, a modified device is described below in conjunction with FIGS. 10 to 13, in which device the negative feedback to prevent bucking is operative in the case of a bucking rotational velocity increase as well. For this purpose, the average of the oscillating curve 3 from FIG. 7 is formed by a low pass filter. This corresponds approximately to the curve 5 in FIG. 7, that is, to the time derivative dn/dt which relates to the constant engine rotational velocity increase without longitudinal vibration.

Figure 10:
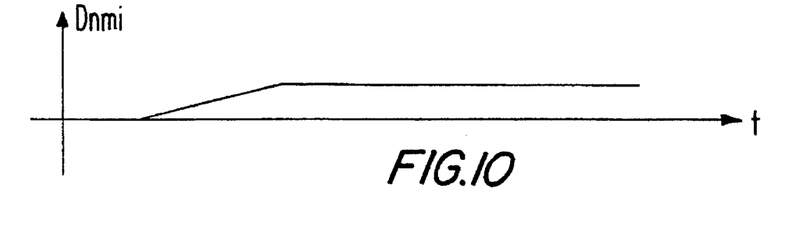
FIGS. 10 to 13 are graphical illustrations similar to those of FIGS. 7 to 9 depicting the determination of the time dependence of the ignition angle correction values, DWARA, with a dynamic correction to prevent a general ignition angle retardation after correction.
Figure 11:
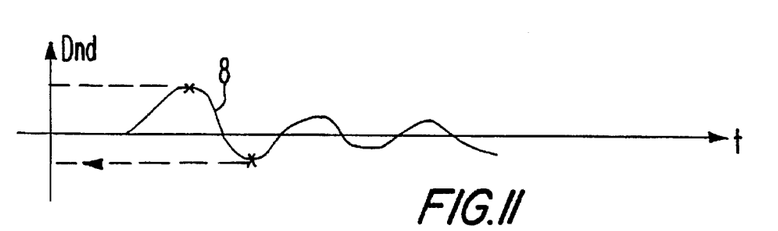

This average Dnmi according to FIG. 10 is subtracted from the curve 3 in FIG. 7, a dynamically corrected value Dnd thereby being obtained in accordance with $$Dnd(k)=Dn(k)-Dnmi(k).$$

This dynamically corrected value Dnd corresponding to the sine curve 8 in FIG. 11 is again symmetrical to the time axis t.

Figure 12:
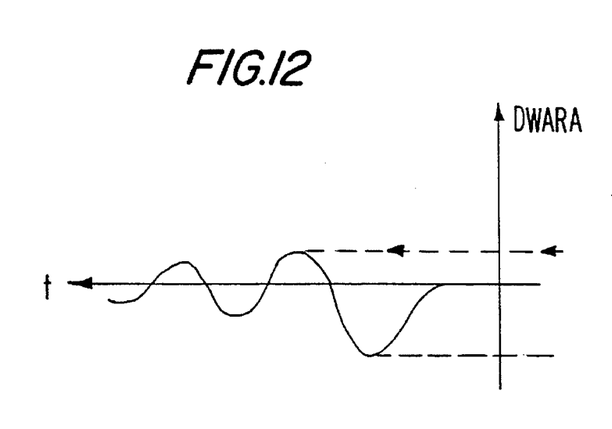
Figure 13:
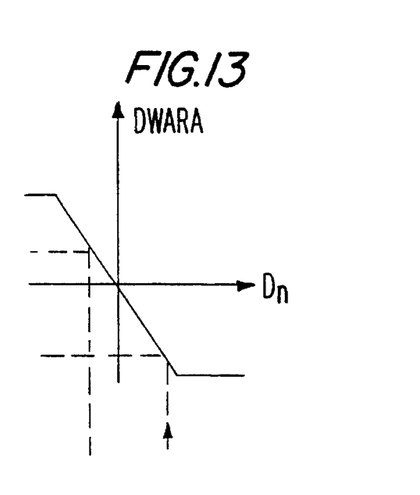

As a result, the characteristic curve in accordance with FIG. 13 is also activated symmetrically, as a result of which the ignition-angle correction value DWARA according to FIG. 12 is also symmetric to the time axis t again. The general shift 6 to retarded ignition angles, as occurred in FIG. 9, is thereby eliminated. Thus, despite the fact that negative feedback for the prevention of a bucking rotational velocity increase is operative, an unlimited torque is available. During the first rotational velocity rise,, during which the average Dnmi has not been corrected, the pronounced ignition angle retardation is initially operative, contributing to a gentler load change.

During steady-state operation (n=constant), the simple function corresponding to FIGS. 1 to 4 is automatically obtained. All transitions are continuous without torque jumps.

Figure 14:
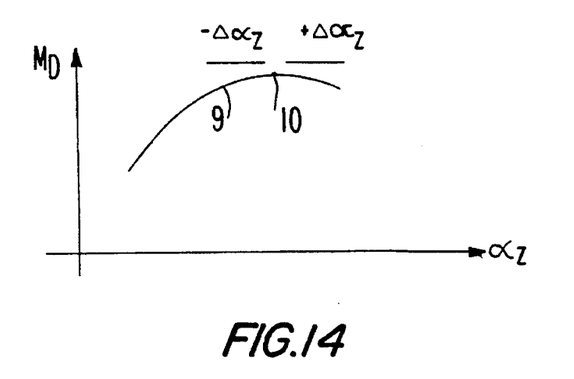
FIG. 14 is a graphical illustration of a standard functional relationship between the engine torque (Md) and the ignition angle, $\alpha z$.

FIG. 14 shows a curve 9 which represents the characteristic of the torque Md in relation to the ignition angle α z. The curve 9 has a maximum 10 which corresponds to an optimum ignition value.

If the precontrol of the ignition angle or of the setpoint ignition angle is designed for this optimum ignition value, an ignition-angle correction towards an advanced ignition (+Δαz) again brings about a torque reduction, which, in contrast to the desired negative feedback, would here act as positive feedback and amplify bucking effects.

It may therefore be necessary under certain circumstances to suppress positive ignition-angle correction values DWARA in defined operating ranges.

Figure 15:
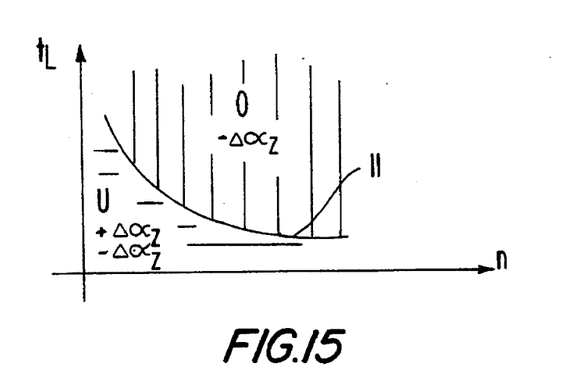
FIG. 15 is a graphical illustration of load (tL) versus engine rotational velocity (n), positive and negative ignition angle corrections being allowed in a lower load range (U) in accordance with a characteristic curve shown in FIG. 16.

A corresponding diagram is given in FIG. 15, where the load tL is plotted against the rotational velocity n. A curve 11 separates an upper load range 0 from a lower load range U. In the upper load range 0, only negative ignition-angle correction values −Δαz are permitted; in the lower load range U, in contrast, both positive corrective ignition-angle values +Δαz and negative values −ΔαZ are permitted.

Figure 16:
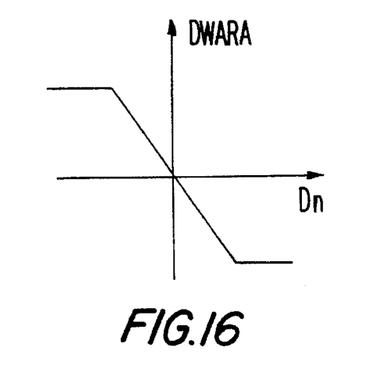
FIG. 16 is a graphical illustration of a relationship between ignition angle correction and differential rotational velocity values which allows both positive and negative ignition angle corrections.
Figure 17:
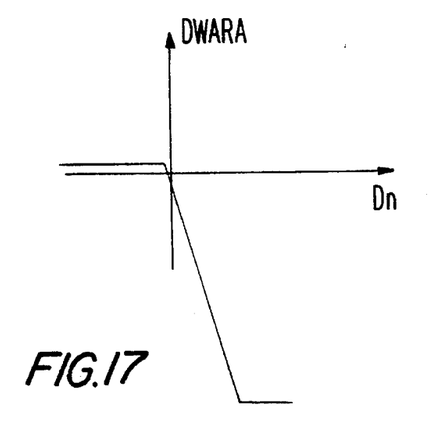
FIG. 17 is a graphical illustration of a relationship between ignition angle correction and differential rotational velocity values which allows negative ignition angle corrections.

This is achieved with the characteristic curve according to FIG. 16 for the lower rotational velocity range U and with the characteristic function according to FIG. 17 for the upper load range 0, the characteristic curve for negative ignition-angle correction values—az in the upper load range 0 here additionally being of different configuration to that in the lower load range U in order to achieve a sufficient torque variation.

Another somewhat more complex embodiment is obtained using a speed- and load-dependent weighting set of characteristic parameters for the ignition-angle correction value DWARA, Which guarantees the optimum torque difference DMd for the negative feedback in all speed/load points in the case of an identical differential rotational velocity value Dn. The following two weighting sets of characteristics for positive and negative values are given here as examples:

```
 tL                    tL
 0 0 0 0               2 2 2 2
 0 0 0 0               2 2 2 2
 1 1 0 0               1 1 2 2
 1 1 1 1  n            1 1 1 1  n
```

Weighting for positive DWARA    Weighting for negative DWARA

Figure 18:
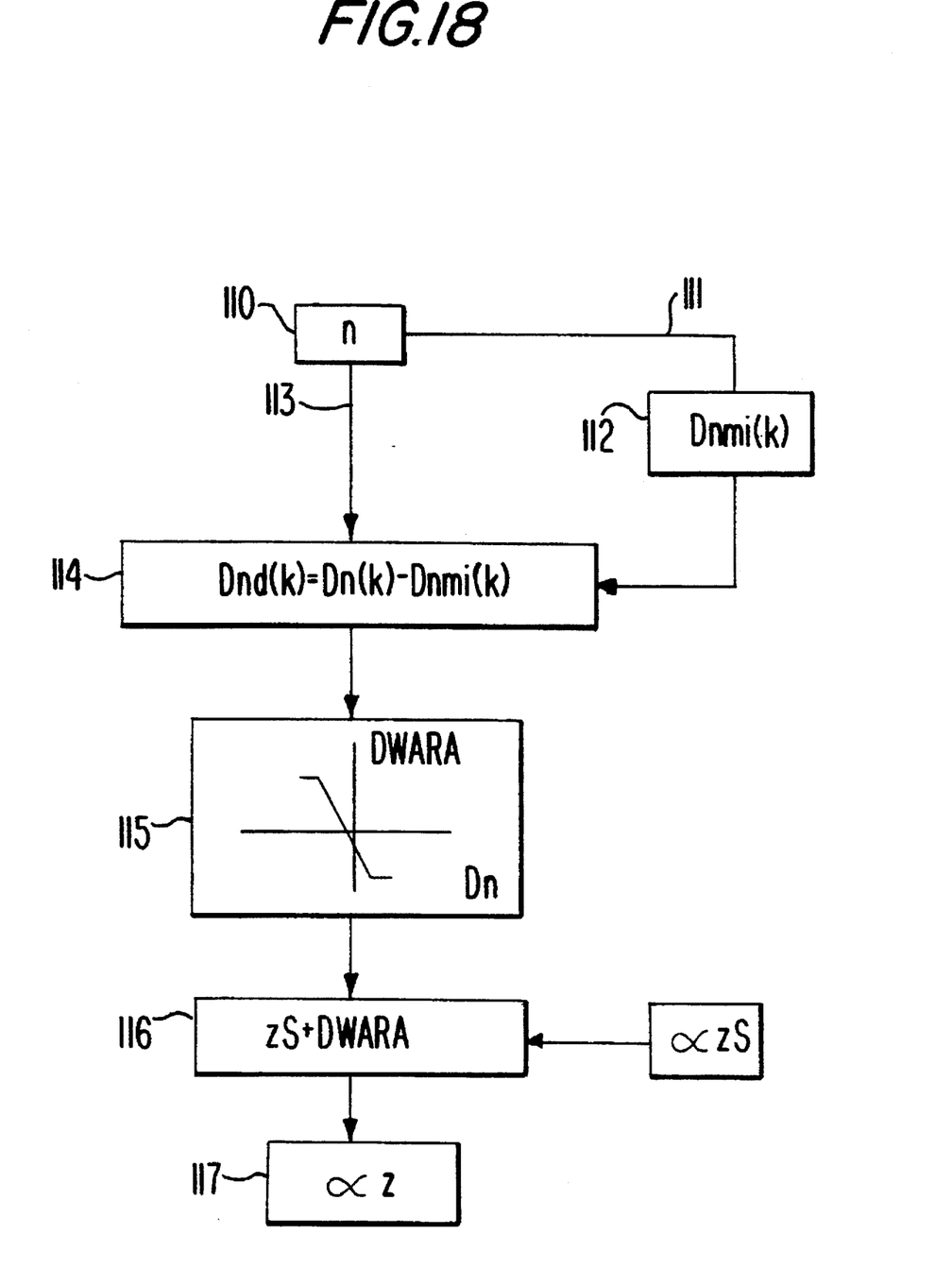
FIG. 18 is a graphical illustration of the steps in a preferred embodiment of the method according to the invention for correcting the ignition angle values to prevent discontinuous longitudinal vibrations of a motor vehicle.

FIG. 18 shows a preferred embodiment of the method according to the invention showing the individual process steps. In a first process step 110 the engine rotational rotational velocities is n are measured by an engine rotational velocity sensor which is well known and currently used with microcomputer controlled fuel injection systems for motor vehicles such as the Motronic System of Robert Bosch GmbH and differential rotational speeds Dn(k) are obtained from n. Then average differential rotational rotational velocities, Dnmi(k), are determined in a second process step 112, for example by a low pass filter, and are fed to a third process step 114 via a connection 111, and the engine rotational velocities are also fed to the third process step 114 via the connection 113. The third process step 114 produces therefrom dynamically corrected engine rotational velocities Dnd(k) by subtraction of the averaged differential rotational velocities from the measured rotational velocities which was explained in more detail above in connection with the other examples. The dynamically corrected engine rotational velocity values Dnd(k) are fed to a processor device performing a following process step 115 in which a predetermined functional relationship between ignition angle correction values and dynamically corrected engine velocity values, for example input to and stored in a microcomputer memory, is used to obtain the ignition angle correction values by addressing the aforesaid functional relationship. Then in a fifth process step 116 also performed in a processor device the corrected ignition angle values 117 are obtained by adding the ignition angle correction values determined in fourth process step 116 to predetermined set values of the ignition angles, for example stored in a microcomputer memory. In the example shown in FIG. 18 the ignition angle correction process is effective for all values of engine speed and engine load, i.e. there are no engine load and speed thresholds.

Figure 19:
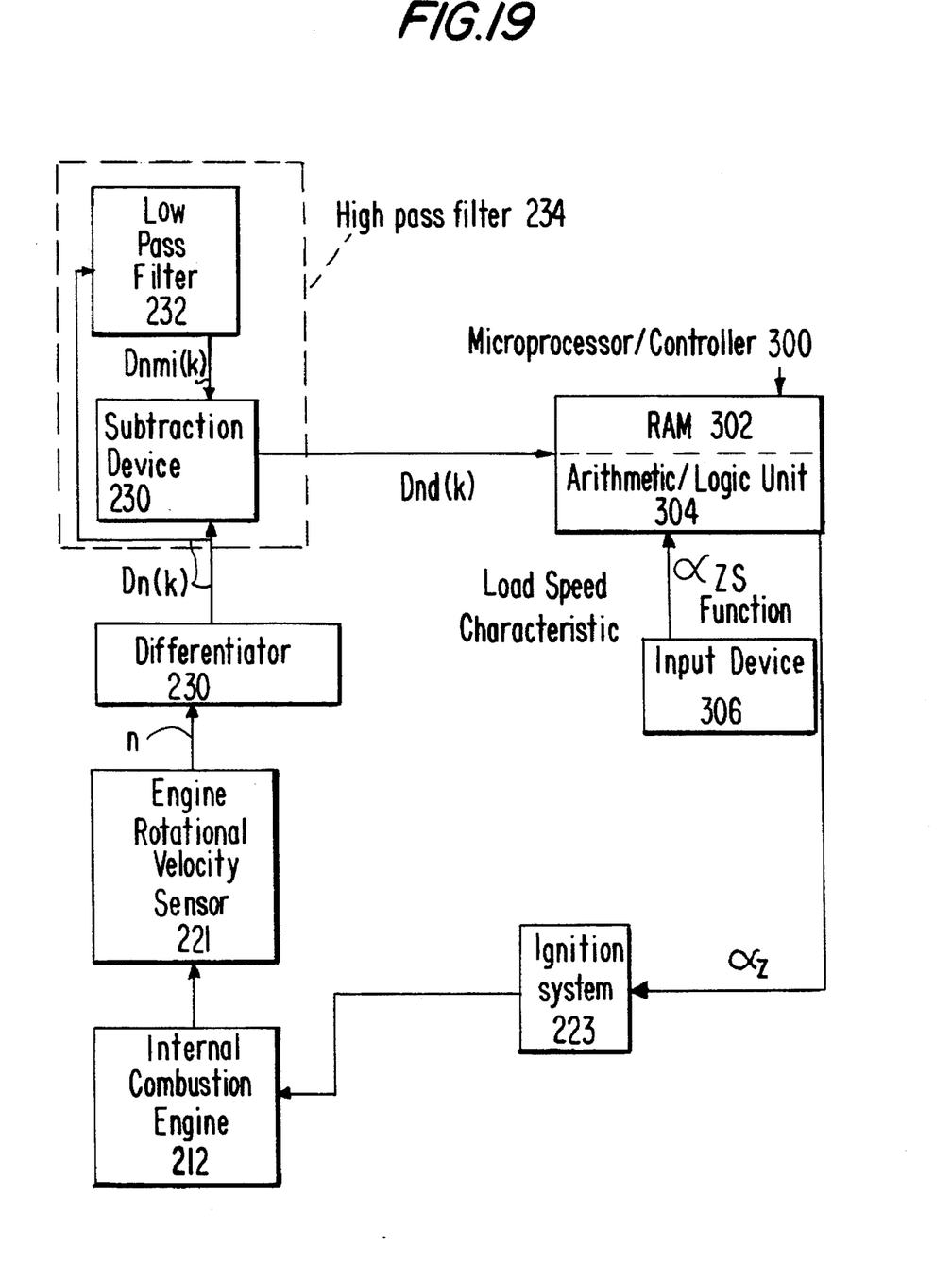
FIG. 19 is a block diagram of one embodiment of a device according to the invention for preventing discontinuous longitudinal vibrations of a motor vehicle including a high pass filter.

FIG. 19 is a block diagram of a preferred embodiment of the device according to the invention for suppressing discontinuous motion of a motor vehicle driven by an internal combustion engine 212 according to the invention. This device includes an engine rotational velocity sensor 221 including means for measuring engine rotational velocity, n(k), which feeds an electronic signal it produces characteristic of the successively measured engine rotational velocities, n(k), to a differentiating device 227 which produces another electronic signal characteristic of differential engine rotational velocities, Dn(k), explained in more detail above. The variable k characterizes the kth time interval. The engine rotational velocity sensor 221 can be a known rotational velocity measuring device used in connection with an internal combustion engine, for example the rotational velocity sensor of the Motronic system for control of fuel injection and ignition of Robert Bosch. This engine rotational velocity sensor comprises an electromagnetic coil placed next to the periphery of a toothed disk or gear driven by the internal combustion engine. As the teeth rotate by the energized electromagnetic coil the magnetic field fluctuates at a frequency determined by the rotation speed of the engine so that a fluctuating voltage is induced in the coil which is the measured electronic signal. Differential speed signals Dn(k) are produced by taking the difference between successive rotational velocity signals in successive intervals k—i.e. by means of differentiator 227, which can be a known differentiator or difference forming circuit.

The differential engine rotational velocities, Dn(k), as explained above must be dynamically corrected to prevent a general retardation of ignition angle and decrease in torque during suppression of discontinuous motion. Thus the differential engine rotational velocities, Dn(k), are fed to a high pass filter device 234 for obtaining the dynamically corrected differential rotational velocities, Dnd(k) from the differential engine rotational velocities Dn(k). The electronic signal produced by the high pass filter device contains only the high frequency components of the differential engine rotational velocities, Dn(k), which are characteristic of the discontinuous motion. As shown in FIG. 19, the high pass filter device 234 comprises a low pass filter device 232 which suppresses the high frequency oscillations characteristic of the discontinuous motion to obtain averaged differential rotational velocities, Dnmi(k), (which are positive during a velocity increase and negative during a velocity decrease) and a substraction device or circuit means 20 for subtracting the averaged differential rotational velocities, Dnmi(k) from the corresponding differential engine rotational velocity values, Dn(k), to obtain the dynamically corrected differential rotational velocity values, Dnd(k)= Dn(k)–Dnmi(k). Then the dynamically corrected differential rotational velocity values are input to a microprocessor/ controller 300 which can be a known microcomputer including a memory 302, advantageously a RAM and/or ROM unit, and an arithmetic and logical processor unit 304 as well as an input device 306. This microprocessor/controller 300 operates according to a stored program for performing the remaining steps of the method for obtaining the corrected ignition angle values which are then input into the ignition system 223 to fire the spark plugs of the internal combustion engine 212 with the proper timing so as to suppress the discontinuous motion of the motor vehicle. The microprocessor can be any of a number of processor/controllers which are currently available and are similar to that used in the Motronic system. An input device 306 must be part of the microprocessor/controller 300 or it must be external to it since the microprocessor/controller must be provided with a predetermined characteristic curve or functional relationship from which the ignition angle correction values are derived by addressing from the input dynamically corrected engine rotational velocity values. Also the set value ignition angles must be stored in memory 302 as well as the characteristic curve so that the corrected ignition angle values, $\alpha_z$, Also, optionally, engine load and engine speed threshold values can be stored in the microprocessor controller memory 302, so that, if the engine speed and engine load are less than the threshold values, the ignition angle correction is suppressed, i.e. the ignition systems uses the original uncorrected set point ignition angles. The program used in the microprocessor/controller 300 is then comparatively simple since it only involves addressing a characteristic function stored in the memory 302 with the dynamically corrected differential rotational velocities to retrieve the ignition angle correction values and addition of the ignition angle correction values to the set point ignition angles to obtain the corrected ignition angles as well as the decisions involving the speed and load thresholds. These steps are all performed in a comparatively simple and well known manner by the standard microprocessor arithmetic and logical processor unit.

It will be understood that each of the elements described above, or two or more together, may also find a useful application in other types of constructions differing from the types described above.

While the invention has been illustrated and described as embodied in a device for suppressing discontinuous motion of a moving motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is desired to be protected by Letters Patent is set forth in the appended claims:

1. A device for suppressing a discontinuous motion of a moving motor vehicle powered by an internal combustion engine, said internal combustion engine having an engine speed and an engine load, said apparatus comprising:

means four measuring engine rotational velocity to obtain an electronic signal characteristic of a plurality of successively measured engine rotational velocities in successive time intervals;

means for producing a differential rotational velocity signal from the electronic signal of the means for measuring engine rotational velocity, said differential rotational velocity signal being characteristic of differential rotational velocities formed from said successively measured engine rotational velocities;

means for obtaining a dynamically corrected differential rotational velocity signal from said differential rotational velocity signal, said dynamically corrected differential rotational velocity signal being characteristic of a plurality of dynamically corrected differential rotational velocities derived from said differential rotational velocities and characteristic only of said discontinuous motion of said motor vehicle;

means for addressing a characteristic function definitive of a relationship between a set of ignition angle correction values and the dynamically corrected differential rotational velocities with said dynamically corrected differential rotational velocity signal to obtain at least one of the ignition angle correction values for suppression of the discontinuous motion; and means for adding the at least one ignition angle correction value obtained from said means for addressing to at least one corresponding setpoint ignition angle value to provide at least one corrected ignition angle value for operation of the internal combustion engine in a manner suppressive of the discontinuous motion.

2. A device as defined in claim 1, wherein said means for obtaining said dynamically corrected differential rotational velocity signal comprises a low pass filter for forming an averaged differential rotational velocity signal from said differential rotational velocity signal and means for subtracting said averaged differential rotational velocity signal from said differential rotational velocity signal to obtain said dynamically corrected differential rotational velocity signal characteristic only of said discontinuous motion of said motor vehicle.

3. A device as defined in claim 1, wherein said means for obtaining said dynamically corrected differential rotational velocity signal comprises a high pass filter for substantially passing only high frequency oscillating differential rotational velocity components of said differential rotational velocity signal characteristic of said discontinuous motion.

4. A device as defined in claim 1, further comprising means for limiting said ignition angle correction values according to said engine load and said engine speed.

5. A device as defined in claim 4, wherein said means for limiting comprises means for operating said internal combustion engine according to said setpoint ignition angle values Without using said corrected ignition angle values when values of said engine load of said internal combustion engine are within a predetermined engine load threshold value and when values of engine speed are within a predetermined engine speed threshold value.

6. A device as defined in claim 4, wherein said means for limiting comprises means for storing a plurality of weighting variables, said weighting variables being a function of said engine load and said engine speed, and means for weighting each of said ignition angle correction values at particular values of the engine load and the engine speed according to said weighting variables for said particular values of the engine load and the speed so as to guarantee an optimum equal differential torque for respectively equal differential engine rotational velocity values.

7. Method for suppressing a discontinuous motion of a moving motor vehicle powered by an internal combustion engine, said internal combustion engine having an engine speed and engine load, said method comprising the steps of:

a) measuring a plurality of engine rotational velocities in successive time intervals to obtain an electronic signal characteristic of said successively measured engine rotational velocities;

b) processing said electronic signal to obtain another electronic signal characteristic of differential engine rotational velocities derived from the successively measured engine rotational velocities;

c) obtaining a dynamically corrected differential rotational velocity signal from said other electronic signal characteristic of said differential engine rotational velocities, said dynamically corrected differential rotational velocity signal consisting of high frequency oscillatory components of said other electronic signal characteristic of only said discontinuous motion of said motor vehicle;

d) addressing a characteristic function definitive of a relationship between a set of ignition angle correction values and the dynamically corrected differential rotational velocities with said dynamically corrected differential rotational velocity signal to obtain at least one of the ignition angle correction values for suppression of the discontinuous motion of the motor vehicle; and e) adding the at least one ignition angle correction value obtained in step d) to at least one corresponding setpoint ignition angle value to provide at least one corrected ignition angle value for operation of the internal combustion engine in a manner suppressive of the discontinuous motion.

8. Method as defined in claim 7, wherein said obtaining said dynamically corrected differential rotational velocity signal includes filtering said other electronic signal characteristic of said differential engine rotational velocities with a high pass filter to pass substantially only an oscillating component of said other electronic signal characteristic of said discontinuous motion.

9. Method as defined in claim 7, wherein said obtaining includes averaging said other electronic signal characteristic of said differential engine rotational velocities by filtering said other electronic signal with a low pass filter to obtain an averaged signal characteristic of averaged differential rotational velocities and subtracting said averaged signal from a said other electronic signal to obtain a dynamically corrected signal characteristic of dynamically corrected differential rotational velocities.

10. Method as defined in claim 7, wherein said characteristic function is such that said ignition angle correction values are symmetric with respect to the setpoint ignition angles.

11. Method as defined in claim 7, wherein said characteristic function is such that said ignition angle correction values are zero when the absolute value of said dynamically corrected differential rotational velocities are less than a predetermined threshold value.

12. Method as defined in claim 7, wherein said characteristic function is linear.

13. Method as defined in claim 7, further comprising the step of operating the internal combustion engine according to said at least one setpoint ignition angle value when values of said engine load and said engine speed are within predetermined operating ranges for the engine load and the engine speed.

14. Method as defined in claim 7, further comprising the steps of storing a plurality of weighting variables, said weighting variables being a function of said engine load and said engine speed and weighting each of said ignition angle correction values at particular values of the engine load and the engine speed according to said weighting variables for said particular values of the engine load and the engine speed so as to guarantee an optimum equal differential torque for respective equal differential engine rotational velocity values.

* * * * *